(No Model.)   2 Sheets—Sheet 1.
H. R. VAN EYCK.
CHEESE FORMING MACHINE.
No. 519,209.   Patented May 1, 1894.
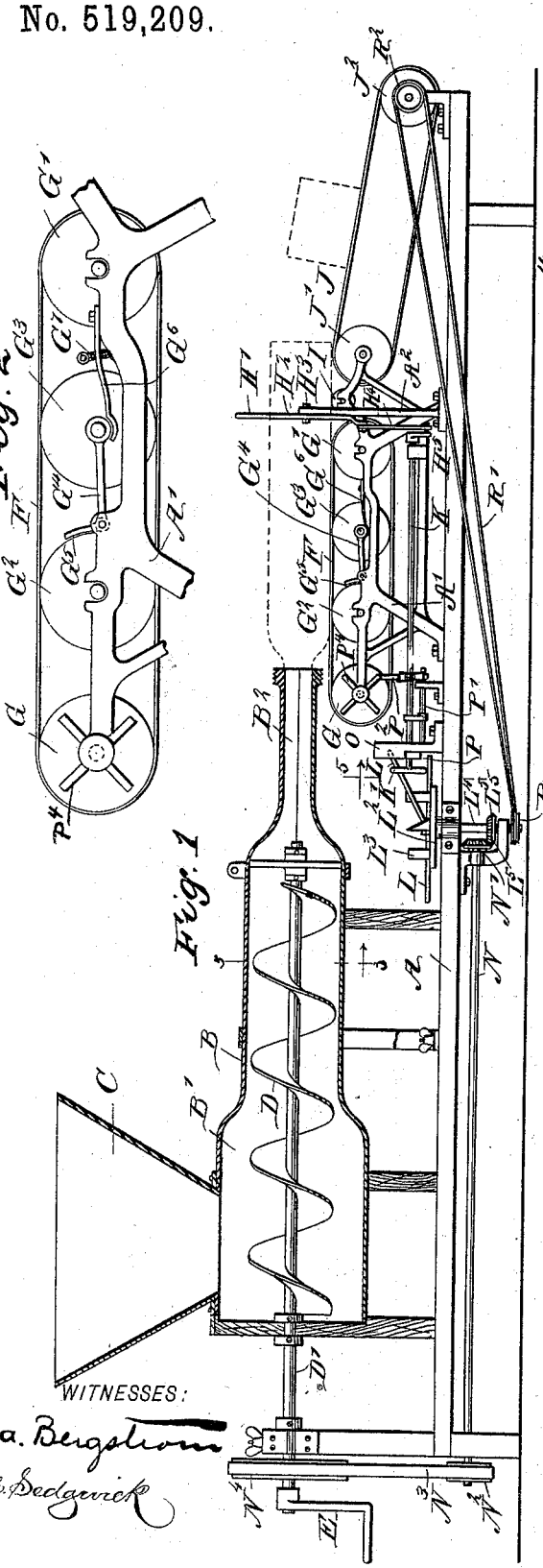
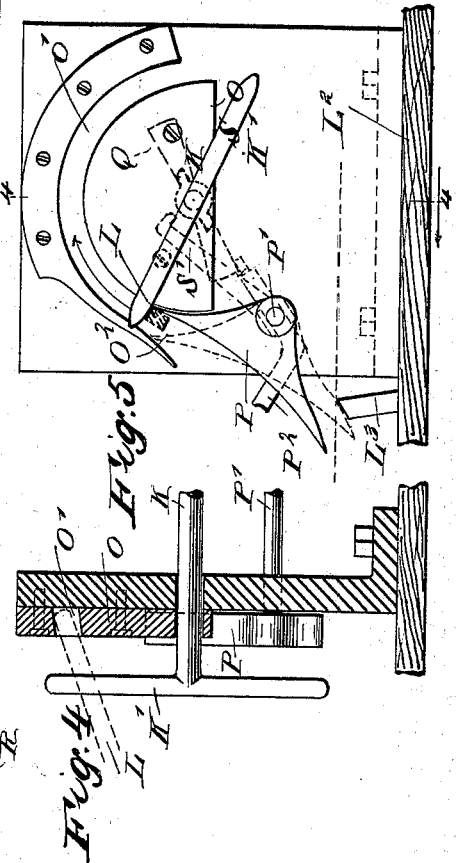
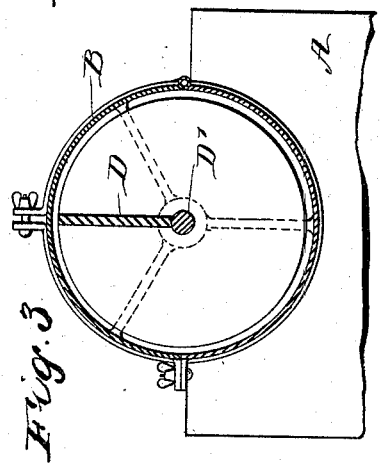
WITNESSES:
J. A. Bergstrom
C. Sedgwick
INVENTOR
H. R. Van Eyck
BY
Munn & Co.
ATTORNEYS.
THE NATIONAL LITHOGRAPHING COMPANY,
WASHINGTON, D. C.

(No Model.) 2 Sheets—Sheet 2.

H. R. VAN EYCK.
CHEESE FORMING MACHINE.

No. 519,209. Patented May 1, 1894.

WITNESSES:
J. A. Bergstrom
C. Sedgwick

INVENTOR
H. R. Van Eyck
BY
Munn & Co
ATTORNEYS.

UNITED STATES PATENT OFFICE.

HENRY R. VAN EYCK, OF ZEELAND, MICHIGAN.

CHEESE-FORMING MACHINE.

SPECIFICATION forming part of Letters Patent No. 519,209, dated May 1, 1894.

Application filed August 22, 1893. Serial No. 483,737. (No model.)

*To all whom it may concern:*

Be it known that I, HENRY RICHARD VAN EYCK, of Zeeland, in the county of Ottawa and State of Michigan, have invented a new and Improved Cheese-Forming Machine, of which the following is a full, clear, and exact description.

The object of the invention is to provide a new and improved cheese forming machine, which is simple and durable in construction, designed to work the soft cheese into a proper form, and to cut the cheese into cakes according to a predetermined weight.

The invention consists principally of a conveying and agitating screw operating in a casing having a contracted outlet discharging onto a conveyer belt propelled by the cheese discharged from the outlet, the speed of the said belt being governed by the weight of the cheese on the belt.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 6:
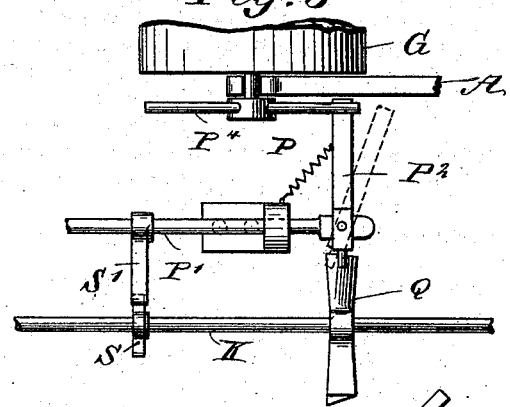
Figure 7:
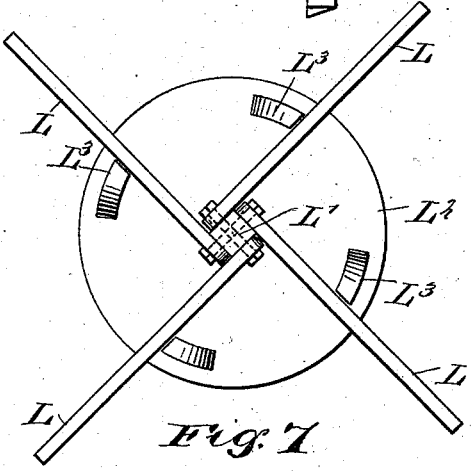
Figure 8:
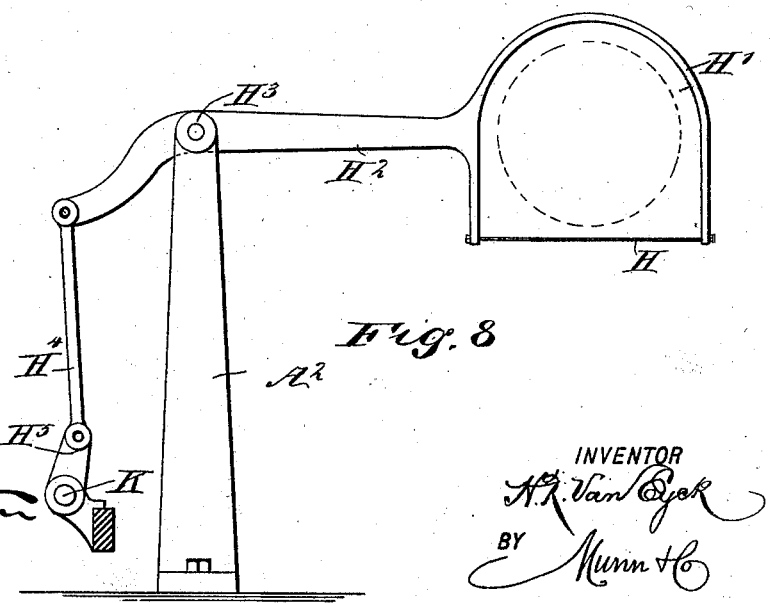

Figure 1 is a sectional side elevation of the improvement. Fig. 2 is an enlarged side elevation of the belt. Fig. 3 is an enlarged transverse section of the conveyer screw and casing on the line 3—3 of Fig. 1. Fig. 4 is an enlarged sectional side elevation of part of the mechanism for operating the cutting device, the section being taken on the line 4—4 of Fig. 5. Fig. 5 is a face view of the same with parts in section on the line 5—5 of Fig. 1. Fig. 6 is an enlarged plan view of part of the mechanism for the cutting device. Fig. 7 is an enlarged plan view of a disk carrying arms for actuating the cutting mechanism; and Fig. 8 is an enlarged cross section of the cutting mechanism.

The improved cheese forming machine is provided with a suitably constructed frame A, on which is supported a conveyer casing B, preferably made in two parts hinged together, as plainly illustrated in Fig. 3, which permit of conveniently opening the casing for cleaning the same and removing its contents. The rear end B' of the casing B is somewhat enlarged and carries a hopper C into which the soft cheese is placed to pass into the casing B, so as to fill the same.

Within the casing B operates a conveyer screw D which serves to agitate the cheese and to convey the same forward into the contracted outlet $B^2$ arranged on the forward end of the casing B. The shafts D' carrying the conveyer screw D is provided at its rear outer end with a crank arm E, for conveniently turning the said shaft, so as to revolve the conveyer screw within the casing. The contracted outlet $B^2$ of the casing B discharges onto a conveyer belt F passing over the end rollers G and G', and the intermediate rollers $G^2$ and $G^3$ of which the rollers G, G', and $G^2$ are mounted to turn in suitable bearings arranged on an auxiliary frame A' bolted or otherwise secured to the frame A. The roller $G^3$ is journaled in a frame $G^4$ pivoted on the auxiliary frame A' and provided with a brake shoe $G^5$ adapted to engage the peripheral surface of the roller $G^2$, so as to brake the latter to retard the motion of the conveyer belt F. The end of the frame $G^4$ carrying the roller $G^3$ is supported on springs $G^6$ attached to the auxiliary frame A', so as to cause an upward swinging of the frame $G^4$ to move the shoe $G^5$ into frictional contact with the roller $G^2$ whenever the weight of the cheese on the belt F decreases. The tension of the springs $G^6$ can be regulated by screws $G^7$ screwing in the auxiliary frame A', as illustrated in Fig. 2. It will be seen that when cheese is discharged by the contracted outlet $B^2$ onto the conveyer belt F, then the latter is caused to travel by the action of the stream of cheese discharged onto the belt, and the weight of the cheese in passing with the belt over the roller $G^3$, presses on the latter, so as to hold the brake shoe $G^5$ normally out of contact with the roller $G^2$. When, however, the cheese discharged on the belt F is not of the sufficient weight to which the frame $G^4$ has been set by adjusting the screws $G^7$ regulating the tension of the springs $G^6$, then the said springs cause the frame $G^4$ to swing upward to move the brake shoe $G^5$ in peripheral contact with the roller $G^2$ so as to retard the movement of the latter and consequently that of the belt F, to permit the cheese to accumulate on the belt until the proper weight is obtained, so that the roller G³ is again pressed downward to move the shoe G⁵ out of frictional contact with the roller G². It will be seen that the stream of cheese discharged by the contracted outlet B² onto the belt F causes the latter to travel forward, but the power of the cheese necessary to propel the said belt causes a retarding of the cheese, so that the latter assumes a larger diameter than it had at the time of leaving the contracted outlet B²; see dotted lines, Fig. 1. The roll of cheese on the conveyer belt F is cut into pieces of the desired weight by means of a wire or a string H extending transversely and secured at its ends in a forked frame H' attached to or forming part of a lever H² fulcrumed at H³ to a bracket A² erected on the frame A; see Fig. 8. When the lever H² swings downward then the string or wire H descends and cuts the cheese transversely in the rear of the roller G' next to a small transverse roller I also journaled in the auxiliary frame A'. After the piece has been cut, the cheese is again moved forward so that on the upward swinging of the lever H² the roll of cheese is again cut by the string or wire H moving upward through the cheese. The piece thus cut off from the roll of cheese passes over the roller I onto an endless apron J passing over rollers J' and J² and arranged in a downwardly and forwardly inclined position, as plainly illustrated in Fig. 1. A traveling motion is given to the belt J, as hereinafter more fully described.

In order to impart the above described swinging motion to the lever H² carrying the cutting wire H, the following device is provided: The lever H² is pivotally connected by a link H⁴ with an arm H⁵ attached to the forward end of a shaft K journaled in suitable bearings on the frame A; see Figs. 1, 4, 5 and 8. On the rear end of the shaft K is secured a diametrical arm K' adapted to be engaged by arms L pivoted on the sides of a square block L' secured in the center of a horizontally disposed disk L² provided with a downwardly-extending shaft L⁴ mounted to turn in suitable bearings on the frame A. On the shaft L⁴ is secured a bevel gear wheel L⁵ in mesh with a bevel gear wheel N' attached to a longitudinally-extending shaft N mounted to turn in suitable bearings on the frame A and carrying at its front end a pulley N² connected by a belt N³ with a pulley N⁴ secured to the conveying screw shaft D', so that when the latter is rotated a rotary motion is transmitted by the said pulleys N⁴, N², and belt N³, to the shaft N, which, by the bevel gear wheels N' and L⁵, imparts a rotary motion to the shaft L⁴ carrying the disk L² so that the latter is rotated and its arms L moved around with the disk. The arms L rest normally against inclined lugs L³ attached to the top of the disk, see Figs. 1 and 7 and the free ends of the said arms are adapted to pass into a semi-circular groove O' formed on a cam O held stationary on the main frame A, see Figs. 1, 4 and 5. The mouth O² at one end of the groove O' is adapted to be opened and closed by a switch tongue P secured on one end of a shaft P' journaled in suitable bearings on the main frame. The lower end of the tongue P is adapted to move in or out of the path of the arms L so as to cause the latter to swing upward to travel over the face of the tongue into the said groove O' at the time the lower end of the tongue is in the position shown in dotted lines in Fig. 5. When, however, the tongue P is in the position shown in full lines in Fig. 5, then the lower end of the tongue is above the free ends of the arms L, so that the latter pass under the said tongue and consequently remain in a horizontal position on the top of the disk L². When the tongue P is in a position to lift one of the arms L then the free end of the latter passes in and through the said groove O' and in contact with one end of the arm K', so that the latter is carried along by the arm L to impart a half revolution to the shaft K. The motion of the shaft K causes the arm H⁵ to swing so that the link H⁴ imparts a swinging motion to the lever H², whereby the string or cutting wire H is moved either up or down so that the roll of cheese is cut either on the up or down stroke of the wire, as above described.

In order to actuate the tongue P to set the cutting mechanism in motion as above described, the following device is provided: On the shaft P' carrying the switch tongue P is secured a pivoted and spring actuated arm P² adapted to be engaged by arms P⁴ arranged radially on the shaft of the roller G. Thus, when the latter is rotated by the belt F being pressed forward by the action of the cheese on the belt, then one of the arms P⁴ presses on the pivoted arm P² to impart a turning motion to the shaft P', so as to move the lower end of the tongue P in the path of the next following arm L to raise the latter and cause it to travel in the groove O' to turn the arm K' and its shaft K, as before described. When arms P⁴ press down arm P² and switch tongue P then arm Q on shaft K disengages P⁴ and P² by moving arm P² sidewise as shown by dotted lines in Fig. 6, so that arm L can raise arm P² and switch tongue P to place and as soon as the arm Q passes the arm P², the spring $p$ returns the arm P² to its normal position. By observing dotted lines of upper end of switch-tongue P, it is plain the arm L raises switch-tongue and arm P² upward. This happens at the time arm P² is in direction of dotted lines; thus the arm P² is raised up and around arm P⁴. The momentum of shaft K is stopped by an arm S similar to arm Q, which catches a hook S' attached to shaft P'. When the switch-tongue goes down, the hook S' rises and unlocks, leaving the shaft K free to run one half revolution. In order to impart a continuous traveling motion to the belt J, I provide the lower end of the shaft L⁴ with a pulley R connected by a belt R' with a pulley R² on the shaft of the roller J².

The operation is as follows: The cheese thrown in the hopper C passes into the casing B, is agitated therein and pressed forward by the conveyer screw D so that the cheese is finally forced through the contracted outlet B² onto the belt F and thereby imparts a forward traveling motion to the said belt, the cheese at the same time enlarging in size by the retarding action of the belt. When the roll of cheese on the belt has moved a sufficient distance beyond the roller G' onto the roller J' then the cutting mechanism is automatically set in motion from the roller G, as above described, so that the wire H cuts off a piece of cheese from the roll and this piece of cheese is carried forward and downward by the apron J to be removed from the lower end of the same by hand.

Having thus fully described my invention, I claim as new and desire to secure by Letters Patent—

1. In a cheese forming machine, the combination with a casing having an outlet, and means for forcing the cheese through said outlet, of a conveyer adapted to receive the cheese discharged from said casing and to be propelled thereby, and means, whereby the resistance offered the cheese will regulate the speed of the conveyer, substantially as described.

2. In a cheese forming machine, the combination with a casing having a contracted outlet, and means for forcing the cheese through said outlet, of a conveyer belt adapted to receive the cheese discharged from the said casing and to be propelled thereby, and means for regulating the speed of the conveyer belt by the weight of the cheese on the said belt, substantially as described.

3. A cheese forming machine, provided with a conveyer belt onto which the cheese is discharged, and rollers over which the said belt passes, one of the said rollers being journaled in a spring-pressed frame and provided with a brake shoe adapted to brake one of the other rollers, substantially as shown and described.

4. A cheese forming machine, comprising a casing having a contracted outlet, a conveyer screw mounted to turn in the said casing, to agitate the cheese therein and force it through the said contracted outlet, a conveyer belt onto which discharges cheese from the said contracted outlet, and rollers over which the conveyer belt passes, one of the rollers being journaled in a spring pressed frame carrying a brake shoe adapted to brake one of the other rollers, substantially as shown and described.

5. A cheese forming machine, comprising a casing having a contracted outlet, a conveyer screw mounted to turn in the said casing, to agitate the cheese therein and force it through the said contracted outlet, a conveyer belt onto which discharges cheese from the said contracted outlet, rollers over which the conveyer belt passes one of the rollers being journaled in a spring-pressed frame carrying a brake shoe adapted to brake one of the other rollers, and a cheese cutting device adapted to operate in unison with the movement of the said belt, substantially as shown and described.

6. A cheese forming machine, comprising a casing having a contracted outlet, a conveyer screw mounted to turn in the said casing, to agitate the cheese therein and force it through the said contracted outlet, a conveyer belt onto which discharges the cheese from said contracted outlet, rollers over which the conveyer belt passes one of the rollers being journaled in a spring-pressed frame carrying a brake shoe adapted to brake one of the other rollers, a cheese cutting device adapted to operate in unison with the movement of the said belt, and an apron for carrying off the cut off piece of cheese, substantially as shown and described.

7. In a cheese forming machine, the combination with the cutting mechanism provided with a shaft having an arm, of a disk mounted to turn and provided with a series of radially-extending pivoted arms, a cam having a semi-circular groove into which are adapted to pass the free ends of the said pivoted arms, and a switch tongue for controlling the mouth of the said semi-circular groove, substantially as shown and described.

8. In a cheese forming machine, the combination with a cutting mechanism provided with a shaft having an arm, of a disk mounted to turn and provided with a series of radially-extending pivoted arms, a cam having a semi-circular groove into which are adapted to pass the free ends of the said pivoted arms, a switch tongue for controlling the mouth of the said semi-circular groove, and means, substantially as described, for imparting a rocking motion to the said switch tongue, as set forth.

9. In a cheese forming machine, the combination with a knife, and a knife operating shaft provided with an arm at one end, of a rotating disk, pivoted arms carried by said disk, a cam in rear of the arm of the knife operating shaft and having a semicircular groove, and means for guiding the said arms into the said groove, substantially as described.

10. In a cheese forming machine, the combination with a knife, and a knife operating shaft provided with an arm at one end, of a rotary disk provided with cam projections, arms pivoted on the disk, a cam in rear of the arm of the knife operating shaft and having a semicircular groove, and an oscillating tongue for controlling the mouth of the said groove, substantially as described.

11. In a cheese forming machine, the combination with a conveyer belt, a knife, and a knife operating shaft provided with an arm at one end, of a rotary disk provided with cam projections, arms pivoted on the disk, a cam in rear of the arm of the knife operating shaft and having a semicircular groove, an oscillating tongue at the mouth of the groove, and means for oscillating the tongue from one of the shafts of the conveyer belt, substantially as described.

12. In a cheese forming machine, the combination with a conveyer belt, radial arms on one of the shafts of one of the rollers of said belt, and a knife operating shaft having an arm at one end, of a rotary disk, a cam in rear of the arm of the knife operating shaft, and having a semicircular groove, a tongue at the mouth of the groove, a shaft upon which the tongue is mounted provided with an arm projecting into the path of the radial arms of the shaft of the conveyer, and means for moving the arm of the tongue carrying shaft out of the path of the said radial arms, substantially as described.

13. In a cheese forming machine, the combination with a conveyer belt, radial arms on one of the shafts of the conveyer, and a knife operating shaft having an arm at one end, of a cam in the rear of the said arm and having a semicircular groove, a rotary disk, arms pivoted on the disk, a tongue at the mouth of the groove, a shaft on which the tongue is mounted provided with a spring actuated arm projecting into the path of the radial arms of the conveyer shaft, means for moving the said arm out of the path of the radial arms from the knife operating shaft, and a locking device for locking the tongue carrying and knife operating shafts together, substantially as described.

HENRY R. VAN EYCK.

Witnesses:
JACOB KRANS,
JOHN VAN EYCK.